(12) United States Patent
Cabadi et al.

(10) Patent No.: US 10,586,172 B2
(45) Date of Patent: Mar. 10, 2020

(54) METHOD AND SYSTEM OF ALARM RATIONALIZATION IN AN INDUSTRIAL CONTROL SYSTEM

(71) Applicant: General Electric Company, Schenectady, NY (US)

(72) Inventors: Jean Francois Cabadi, Massy (FR); Herve Sabot, Massy (FR)

(73) Assignee: General Electric Company, Schenectady, NY (US)

( * ) Notice: Subject to any disclaimer, the term of this patent is extended or adjusted under 35 U.S.C. 154(b) by 941 days.

(21) Appl. No.: 15/180,134

(22) Filed: Jun. 13, 2016

(65) Prior Publication Data

US 2017/0357908 A1    Dec. 14, 2017

(51) Int. Cl.
| | | |
|---|---|---|
| *G06N 20/00* | (2019.01) | |
| *G08B 29/18* | (2006.01) | |
| *G05B 13/02* | (2006.01) | |
| *G05B 23/02* | (2006.01) | |

(52) U.S. Cl.
CPC ......... *G06N 20/00* (2019.01); *G05B 13/0265* (2013.01); *G05B 23/0281* (2013.01); *G08B 29/186* (2013.01); *G05B 23/0267* (2013.01)

(58) Field of Classification Search
CPC ......... G05B 13/0265-0295; G05B 13/04-048; G05B 23/0259-0297; G08B 29/186
See application file for complete search history.

(56) References Cited

U.S. PATENT DOCUMENTS

| | | | |
|---|---|---|---|
| 7,679,504 B2 * | 3/2010 | Wang | A61B 5/0205 340/506 |
| 8,890,676 B1 | 11/2014 | Heath | |
| 9,208,677 B2 | 12/2015 | Szudajski et al. | |
| 9,225,587 B2 | 12/2015 | Zhang et al. | |
| 9,355,477 B2 * | 5/2016 | Ashley | G06T 11/206 |
| 2007/0194920 A1 | 8/2007 | Hollifield | |
| 2008/0297513 A1 | 12/2008 | Greenhill et al. | |
| 2010/0004759 A1 * | 1/2010 | Scott | G05B 23/0216 700/12 |
| 2010/0211192 A1 | 8/2010 | Stluka et al. | |

FOREIGN PATENT DOCUMENTS

CN    104035342 A    9/2014

OTHER PUBLICATIONS

Hu, Wenkai et al.; An Application of Advanced Alarm Management Tools to an Oil Sand Extraction Plant; ELSEVIER; IFAC—PapersOnLine 48-8 (2015) 641-646. (Year: 2015).*

(Continued)

*Primary Examiner* — Stanley K. Hill
(74) *Attorney, Agent, or Firm* — Armstrong Teasdale LLP (57) ABSTRACT

Described herein are systems and methods of alarm rationalization for an industrial control system. This can comprise building a model of the industrial control system, wherein the model includes components that are monitored or controlled by the industrial control system and alarms associated with the components; training the model by applying one or more machine learning algorithms against a historical database of alarms for the industrial control system; and applying the trained model against the industrial control system for alarm management of the industrial control system.

14 Claims, 5 Drawing Sheets

(56) References Cited

OTHER PUBLICATIONS

Izadi, Iman et al.; An Introduction to Alarm Analysis and Design; 2009; Proceedings of the 7th IFAC Symposium on Fault Detection, Supervision and Safety of Technical Processes; pp. 645-650. (Year: 2009).*

Wang, Jiandong et al.; An Overview of Industrial Alarm Systems: Main Causes for Alarm Overloading, Research Status, and Open Problems; IEEE Transactions on Automation Science and Engineering, vol. 13, No. 2, Apr. 2016; pp. 1045-1061. (Year: 2016).*

Abele, List et al.; Combining Knowledge Modeling and Machine Learning for Alarm Root Cause Analysis; 2013; 7th IFAC Conference on Manufacturing Modelling, Management, and Control International Federation of Automatic Control; pp. 1843-1848. (Year: 2013).*

Vogel-Heuser, Birgit et al.; Criteria-based alarm flood pattern recognition using historical data from automated production systems (aPS); ELSEVIER; Mechatronics 31 (2015) 89-100. (Year: 2015).*

Jacobs, Sam Ade et al.; Large-Scale Industrial Alarm Reduction and Critical Events Mining using Graph Analytics on Spar; 2016 IEEE Second International Conference on Big Data Computing Service and Applications; pp. 66-71. (Year: 2016).*

Wang, Jiandong et al.; 2014 IEEE; Online root-cause analysis of alarms in discrete Bayesian networks with known structures; Proceeding of the 11th World Congress on Intelligent Control and Automation (2014); pp. 467-472. (Year: 2014).*

Cheng, Yue et al.; Pattern matching of alarm flood sequences by a modified Smith—Waterman algorithm; 2013 ELSEVIER; chemical engineering research and design 9 1 ( 2 0 1 3 ) 1085-10 (Year: 2013).*

Ahmed et al., Similarity Analysis of Industrial Alarm Flood Data, Automation Science and Engineering, IEEE Transactions, 10:452-457, 2013.

Koene et al., Alarm management and rationalization, Third International conference on loss Prevention, 2000.

Nishiguchi et al., IPL2 and 3 performance improvement method for process safety using event correlation analysis, Computers & Chemical Engineering, 34:2007-2013, 2010.

* cited by examiner

METHOD AND SYSTEM OF ALARM RATIONALIZATION IN AN INDUSTRIAL CONTROL SYSTEM

TECHNICAL FIELD

Aspects of the disclosure relate generally to a computer aided system and method based on data analytics and machine learning in order to support the process of alarm rationalization for industrial control systems.

BACKGROUND

Digital industrial control systems (ICS) have proliferated over the last few decades. With the growth of ICS has come massive growth in data collection and storage of ICS. For example, one combined-cycle power plant can generate four terabytes of data in a single year while a steam-turbine power plan can generate 18 TBs or more of date each year. Much of this data is alarm data that is associated with alarm and alert monitoring and interaction capabilities for various types of devices, such as sensors, pumps, valves, and the like that are controlled and/or monitored by the ICS. Because of the massive increase in alarm data, alarm rationalization has become important.

Alarm rationalization is the process of reviewing, validating, and justifying alarms that meet the criteria of an alarm. In other words, the rationalization specifies only those points in the process system that require alarming. Presently, much of the alarm rationalization process is performed manually—engineers review alarm database and make decisions regarding the alarm rationalization process. These decisions are then hard-coded into the software that comprises the ICS. Furthermore, the process is not discrete—it needs to be repeated over the life of the ICS as components are added or removed from the process and the ICS is adapted accordingly. Because of the huge amounts of data that must be analyzed and the time and effort required, there is a desire to use data analytics and machine learning techniques in order to support the process of alarm rationalization for industrial control systems Therefore, systems and methods are desired that overcome challenges in the art, some of which are described above.

SUMMARY

Disclosed herein is a method of alarm rationalization for an industrial control system. In one aspect, the method comprises building a model of the industrial control system, wherein the model includes components that are monitored or controlled by the industrial control system and alarms associated with the components; training the model by applying one or more machine learning algorithms against a historical database of alarms for the industrial control system; and applying the trained model against the industrial control system for alarm management of the industrial control system.

Optionally or alternatively, the method may further comprise refining the model by machine learning after the model has been applied against the industrial control system.

Optionally or alternatively, the method may further comprise applying the trained model against a database of alarms before applying the trained model against the industrial control system for testing purposes.

In one aspect of the method, training the model by applying one or more machine learning algorithms against the historical database of alarms for the industrial control system may comprise one or more of grouping alarms, decreasing alarm levels, or creating contextual alarms. For example, training the model by applying one or more machine learning algorithms against the historical database of alarms for the industrial control system comprises using a data mining algorithm to identify frequent patterns in alarm sequences, using a clustering or association rules mining algorithm to correlate alarms and process state, or using a supervised machine learning to model the rationalization process.

Also disclosed herein is a system for alarm rationalization for an industrial control system. In one aspect, the system comprises a computing device, the computing device having at least a processor and a memory, wherein the processor executes computer-executable instructions stored in the memory, said computer executable instructions cause the processor to: build a model of the industrial control system, wherein the model includes components that are monitored or controlled by the industrial control system and alarms associated with the components; train the model by applying one or more machine learning algorithms against a historical database of alarms for the industrial control system; and apply the trained model against the industrial control system for alarm management of the industrial control system.

Optionally or alternatively the system may further comprise the processor executing computer-executable instructions stored in the memory that cause the processor to refine the model by machine learning after the model has been applied against the industrial control system.

Optionally or alternatively the system may further comprise the processor executing computer-executable instructions stored in the memory that cause the processor to apply the trained model against a database of alarms before applying the trained model against the industrial control system for testing purposes.

In one aspect of the system, training the model by applying one or more machine learning algorithms against the historical database of alarms for the industrial control system comprises the processor executing computer-executable instructions stored in the memory that cause the processor to one or more of grouping alarms, decreasing alarm levels, or creating contextual alarms. For example, training the model by applying one or more machine learning algorithms against the historical database of alarms for the industrial control system may comprise the processor executing computer-executable instructions stored in the memory that cause the processor to apply one or more of a data mining algorithm to identify frequent patterns in alarm sequences, using a clustering or association rules mining algorithm to correlate alarms and process state, or using a supervised machine learning to model the rationalization process.

In one aspect of the system, the computing device may comprise an alarm server.

Further disclosed herein is a non-transitory computer-readable medium comprising computer-executable instructions for dynamically displaying a network of alarms. In one aspect, the instructions comprise building a model of the industrial control system, wherein the model includes components that are monitored or controlled by the industrial control system and alarms associated with the components; training the model by applying one or more machine learning algorithms against a historical database of alarms for the industrial control system; and applying the trained model against the industrial control system for alarm management of the industrial control system.

Optionally or alternatively the instructions may comprise refining the model by machine learning after the model has been applied against the industrial control system.

Optionally or alternatively the instructions may comprise applying the trained model against a database of alarms before applying the trained model against the industrial control system for testing purposes.

In one aspect of the computer-readable medium, the instructions for training the model by applying one or more machine learning algorithms against the historical database of alarms for the industrial control system may comprise one or more of grouping alarms, decreasing alarm levels, or creating contextual alarms. For example, training the model by applying one or more machine learning algorithms against the historical database of alarms for the industrial control system comprises applying one or more of a data mining algorithm to identify frequent patterns in alarm sequences, using a clustering or association rules mining algorithm to correlate alarms and process state, or using a supervised machine learning to model the rationalization process.

In one aspect of the computer-readable medium, the computer-executable instructions are executed by an alarm server.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices. Furthermore, all or portions of aspects of the disclosed can be implemented using cloud-based processing and storage systems and capabilities. One such non-limiting example of a cloud-base service that can be used in implementations of the disclosed is GE Predix™, as available from the General Electric Company (Schenectady, N.Y.). Predix™ is a cloud-based PaaS (platform as a service) that enables industrial-scale analytics for asset performance management (APM) and operations optimization by providing a standard way to connect machines, data, and people.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Fast-growing digital industrial control systems (ICS) can present operators with floods of alarms that they cannot effectively process and handle. Alarm rationalization can help with this overload of information; however, it is generally a time-intensive process carried out by engineers resulting in a costly engineering task.

Figure 1:
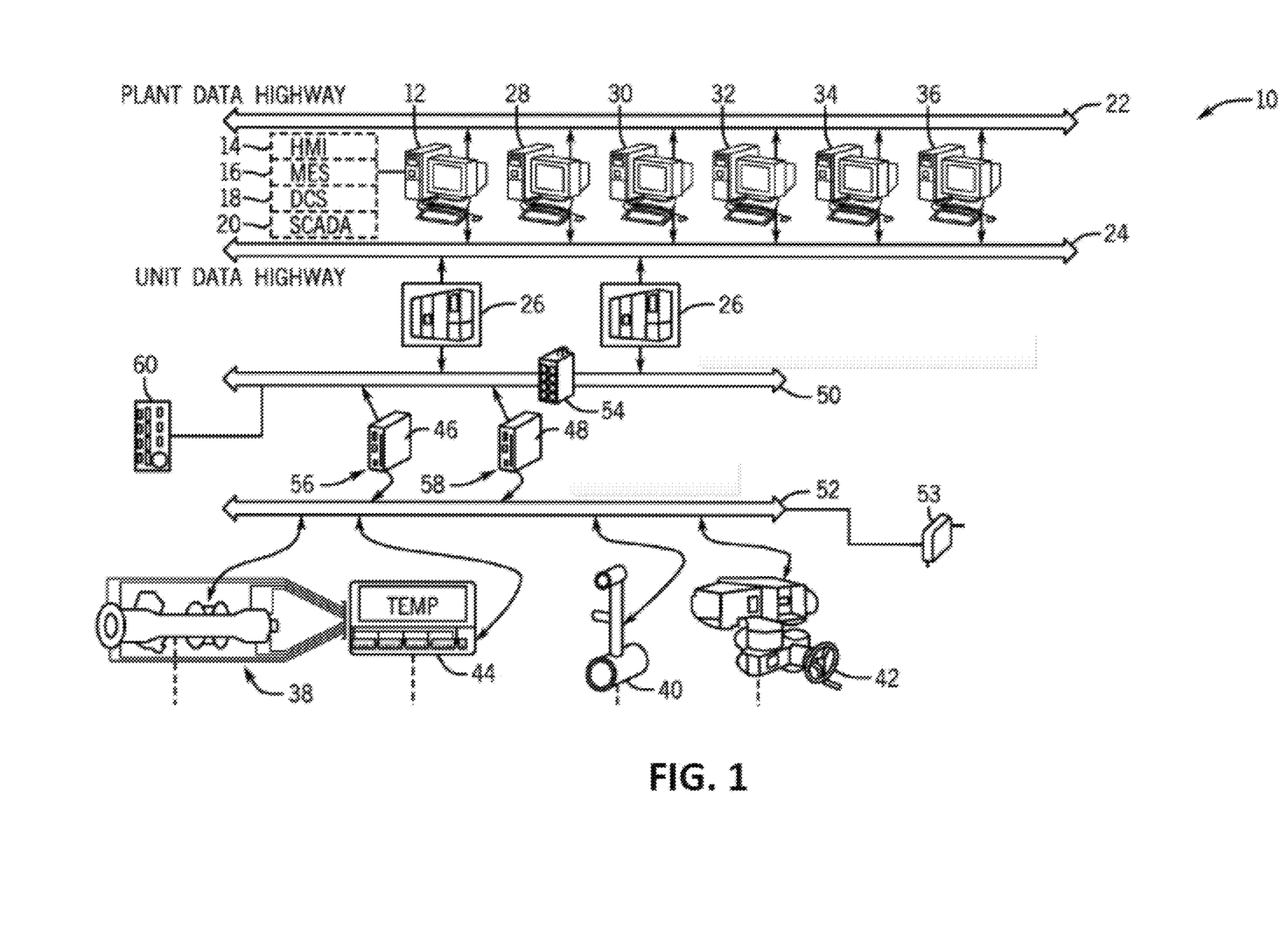
FIG. 1 illustrates an exemplary embodiment of an industrial control system.

Turning to FIG. 1, an embodiment of an industrial control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as, for example, a human-machine interface (HMI) software 14, a manufacturing execution system (MES) 16, a distributed control system (DCS) 18, and/or a supervisor control and data acquisition (SCADA) system 20, and the like. For example, the computer 12 may host ControlST™ software, available from General Electric Co., of Schenectady, N.Y., and the like. The computer 12 described herein comprise at least a processor and a memory. Processor refers to a physical hardware device that executes encoded instructions for performing functions on inputs and creating outputs. Exemplary processors for use in this disclosure are described herein in relation to FIG. 4.

Further, the computer 12 can be communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, a computer 36 hosting an alarm viewer, and the like. Other computers coupled to the plant data highway 22 and/or the unit data highway 24 may include computers hosting Cimplicity™, ControlST™, and Toolbox ST™.

The system 10 may include any number and suitable configuration of industrial controllers 26. For example, in some embodiments the system 10 may include one industrial controller 26 or two, three, or more industrial controllers 26 for redundancy. The industrial controllers 26 may enable control logic useful in automating a variety of plant equipment, such as a turbine system 38, a valve 40, a pump 42, and the like. Indeed, the industrial controller 26 may communicate with a variety of devices, including but not limited to temperature sensors 44, flow meters, pH sensors, temperature sensors, vibration sensors, clearance sensors (e.g., measuring distances between a rotating component and a stationary component), pressure sensors, and the like. The industrial controller 26 may further communicate with electric actuators, switches (e.g., Hall switches, solenoid switches, relay switches, limit switches), and so forth. Though FIG. 1 is generally directed to a power generation application, it is to be appreciated that embodiments of the disclosed invention are not limited to such applications and is also applicable to oil and gas, water, industrial controls and the like.

In the depicted embodiment, the turbine system 38, the valve 40, the pump 42, and the temperature sensor 44 are communicatively interlinked to the automation controller 26 by using linking devices 46 and 48 suitable for interfacing between an I/O network 50 and a field network 52. In some embodiments, a linking device, such as the linking device 48, may be coupled to the I/O network through a switch 54. In such an embodiment, other components coupled to the I/O network 50, such as one of the industrial controllers 26, may also be coupled to the switch 54. Accordingly, data transmitted and received through the I/O network 50, such as a 100 Megabit (MB) high speed Ethernet (HSE) network, may in turn be transmitted and received by the field network 52, such as a 31.25 kilobit/sec network. That is, the linking devices 46 and 48 may act as bridges between the I/O network 50 and the field network 52. Accordingly, a variety of devices may be linked to the industrial controller 26 and to the computer 12. For example, the devices, such as the turbine system 38, the valve 40, the pump 42, and the temperature sensor 44, may include industrial devices that include support for the field bi-directional communications protocol. The devices 38, 40, 42, and 44 may include support for communication protocols such as those included in the HART® Communications Foundation (HCF) protocol, the Profibus Nutzer Organization e.V. (PNO) protocol, the Foundation H1 protocol, and the like.

Each of the linking devices 46 and 48 may include one or more segment ports 56 and 58 useful in segmenting the field network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58, may enable a physical separation useful in maintaining fault tolerance, redundancy, and improving communications time. In some embodiments, additional devices may be coupled to the I/O network 50. For example, in one embodiment an I/O pack 60 may be coupled to the I/O network 50.

Figure 2:
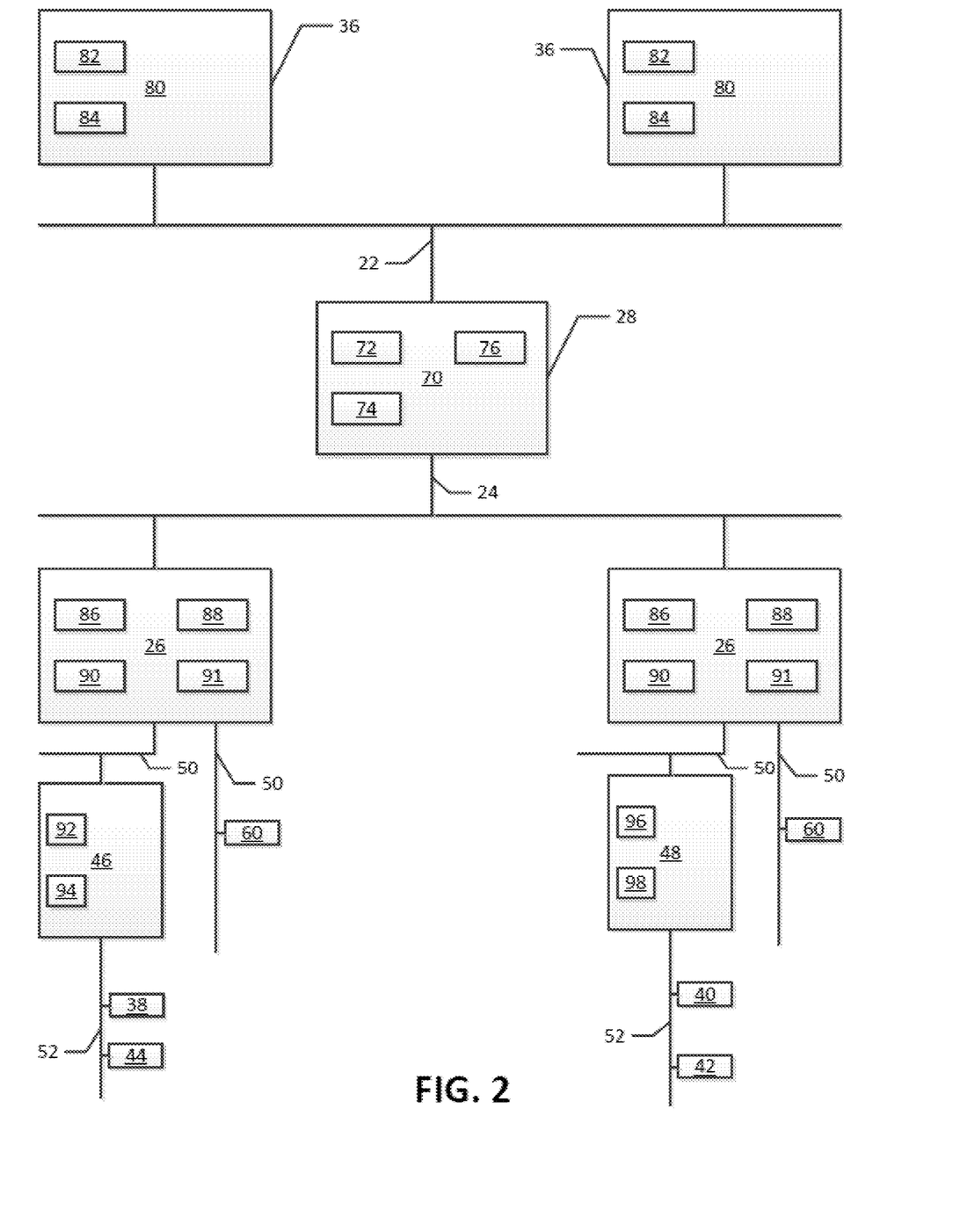
FIG. 2 depicts a block diagram of an embodiment of the system depicting various components in further detail.

In some embodiments, the devices 38, 40, 42, and 44 may provide data, such as alerts, to the system 10. These alerts may be handled in accordance with the embodiments described below. FIG. 2 depicts a block diagram of an embodiment of the system 10 depicting various components in further detail. As described above, the system 10 may include an alarm server 70, executed on the computer 28, coupled to the plant data highway 22 and the unit data highway 24. The computer 28 may include a memory 72, such as non-volatile memory and volatile memory, and a processor 74, to facilitate execution of the alarm server 70. The alarm server 70 may execute an alarm process 76 for receiving, processing, and responding to alarms received from the controllers 26.

The system 10 may include additional computers 36 coupled to the plant data highway 22 that may execute alarm viewers 80. The alarm viewers 80 may enable a user to view and interact with the alarms processed by the alarm server 70. The computers 36 may each include a memory 82 and a processor 84 for executing the alarm viewer 80. Additionally, in some embodiments, the alarm viewers 80 may be executed on the computer 28 or any of the computers described above in FIG. 1. The alarm server 70 may communicate with the alarm viewers 80 using any suitable alarm data protocol interpretable by the alarm viewers 80.

As described above, the controllers 26 are coupled to the unit data highway 24, and the controllers 26 may communicate with the alarm server 70 over the unit data highway 24. For example, in one embodiment, the controllers 26 and alarm server 70 may communicate using a serial data interface (SDI) alarm protocol. The controllers 26 may each include a memory 86 and a processor 88 for executing the functions of the controllers 26. In one embodiment, the controllers 26 may execute a sequence of events (SOE) process 90 and an alarm process 91. As mentioned above, the controllers 26 may be coupled to the I/O pack 60 over the I/O network 50. In one embodiment, the I/O pack 60 may communicate with the controllers 26 using the ADL protocol.

As also described above, the controllers 26 may be coupled to linking devices 46 and 48 through an I/O network 50. The linking devices 46 and 48 may communicate with the controllers 26 over the I/O network 50. The linking devices 46 and 48 may be coupled to the field network 52, and one linking device 46 may be coupled to devices 38 and 44 and another linking device 48 may be coupled to device 40 and 42. The linking device 46 may include a memory 92, such as volatile and non-volatile memory, and a processor 94, and the linking device 48 may include a memory 96, such as volatile and non-volatile memory, and a processor 98. In one embodiment, the linking devices 46 and 48 may communicate with the controllers 26 using various protocols as described herein.

The system 10 may enable alarm and diagnostic information to be communicated from the various devices to a user, such as through the HMI 14 and the alarm viewers 80. For example, the devices 38, 40, 42, and 44 may provide an alarm to the controller 26. The alarm may be provided from the controller 26 to the alarm server 70, which may process the alarm and provide information to the HMI 14, the alarm viewers 80, or any other computers coupled to the unit data highway 24 or plant data highway 22.

As shown in FIGS. 1 and 2, devices (e.g., 38, 40, 42, and 44) can provide an alarm or alert data to the controller(s) 26. For example, the alarm or alert data may include process alarm data, sequence of events data, process holds data, process events data, and/or diagnostic alarm data. Diagnostic alarms are generated by predetermined conditions that are not defined by a user. Process alarms are generated by user-defined conditions configured in the industrial process control system 10.

Process alarms may include Boolean alarms, analog process alarms, Boolean process events, and Boolean process holds. The Boolean alarms are triggered upon an alarm property of the device (e.g., 38, 40, 42, and 44) transitioning from "true" to "false" or from "false" to "true". Analog process alarms may include bad quality alarming, deviation hysteresis alarming, multi-level high and low threshold alarming, and rate of change hysteresis alarming. Additionally, Boolean process holds restrict sequences of application code from being run until certain events occur by monitoring for a device's hold variable reaching a "true" state. Upon reaching the "true" state, the next phase of the application code sequence may be executed. Finally, IO pack diagnostic alarms trigger upon detection of unusual circumstances of the IO pack internal variables, which are variables that illustrate how a device is functioning. The IO pack sequence of events provides a time stamped alert each time a configured control variable changes.

The controller(s) 26 provide controller diagnostic alarm data, sequence of event data, process alarm data, and/or IO pack diagnostic alarm data to a configuration system. In some embodiments, the configuration system may be ToolboxST™, as available from General Electric Co., of Schenectady, N.Y. Controller diagnostic alarms are triggered upon the controller(s) 28 detecting unusual circumstances. The configuration system may be used to configure the alarm and alert settings for each of the alarm or alert data mentioned above. Additionally, the controller(s) 26 can provide the process alarm data, controller diagnostic alarm data, sequence of events data, and/or IO pack diagnostic alarm data to the alarm server 70.

Boolean process alarms may be removed (i.e., no longer shown as a triggered alarm) by a networked client acknowledging the alarm, resetting the alarm values to normal, or instructing the alarm to reset. Boolean process events may be removed upon a networked client acknowledging the event, and Boolean process holds may be removed upon a networked client acknowledging the hold or instructing the hold to reset, or the hold's process values returning to a normal state.

Additionally, diagnostic alarms may be removed upon a networked client acknowledging the alarm or resetting the alarm, or the alarm returning to a normal state. IO pack sequences of events may be removed upon the sequence of events being acknowledged by a networked client. With regard to the controller(s) 26, the controller diagnostics may be removed upon a networked client acknowledging the alarm or instructing the alarm to reset, or the alarm returning to a normal state.

The alarms described herein may be of the OLE for Process Control (OPC) type. OPC is the original name for standards specification developed in 1996 by an industrial automation industry task force, specifying the communication of real-time plant data between control devices from different manufacturers. The acronym can also stand for "Open Platform Communications" or "Open Productivity & Connectivity," which refer to the same standard.

The OPC is a non-proprietary technical specification designed to provide business applications with easy and common access to industrial plant floor data. OPC defines a common, high-performance interface that permits users to write a custom interface, or server/driver to exchange data with hardware field devices. This custom interface is written once and can then be easily reusable by Human Machine Interface (HMI), Supervisory Control and Data Acquisition SCADA, Control and custom applications.

OPC Unified Architecture, OPC UA, is an OPC industrial machine to machine communication protocol for interoperability and is the successor to OPC. OPC Alarms and Events, OPC AE, is another OPC protocol that defines the exchange of alarm and event type message information, as well as variable states and state management.

Figure 3:
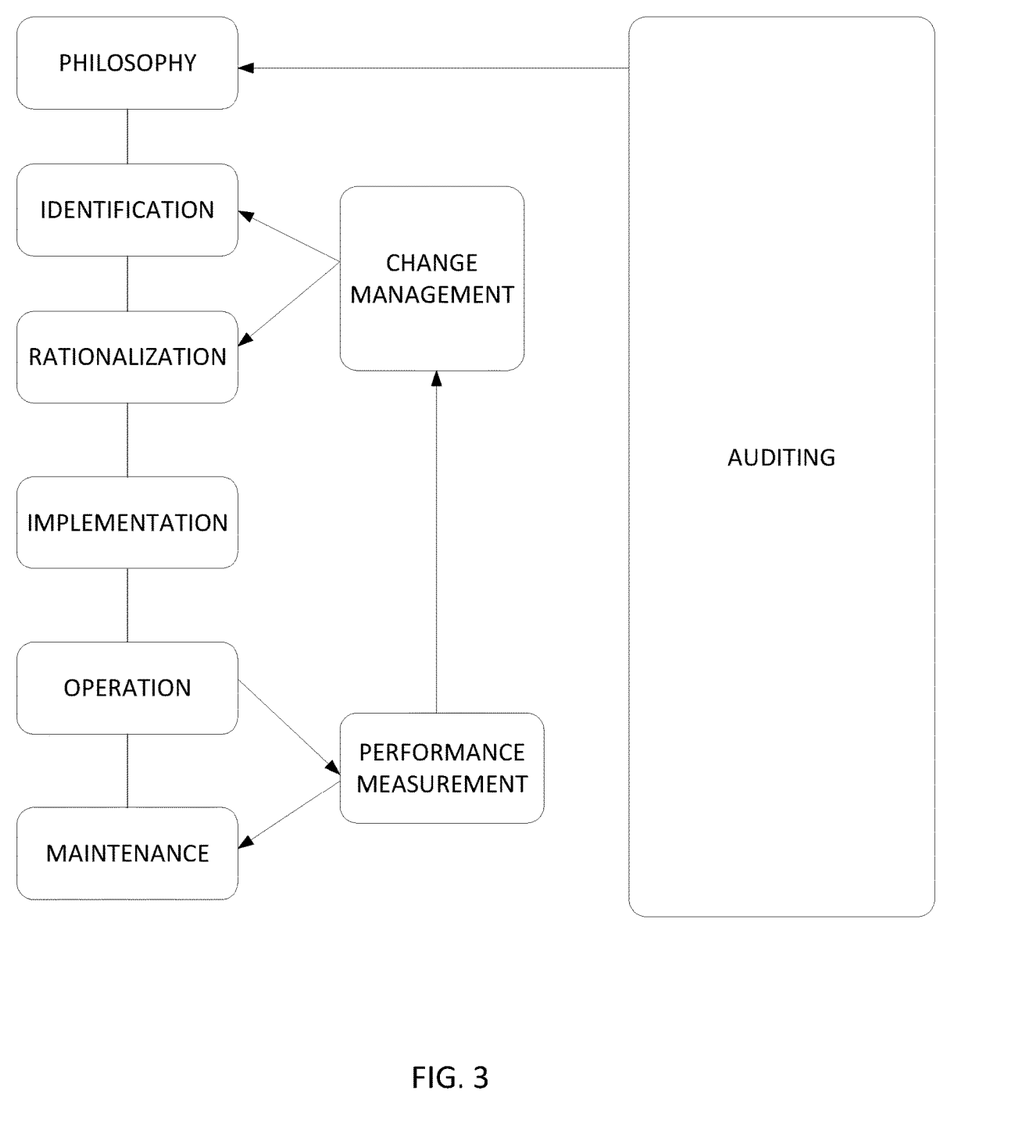
FIG. 3 is a block diagram illustrating an exemplary workflow for performing the disclosed method.

Because alarms may be correlated, ICS undergo a process or alarm rationalization. FIG. 3 illustrates an exemplary workflow that can be used for alarm rationalization for an industrial control system. Currently, as described herein, much of the alarm rationalization process is performed manually—engineers review alarm database and make decisions regarding the alarm rationalization process. These decisions are then hard-coded into the software that comprises the ICS. Furthermore, the process is not discrete—it needs to be repeated over the life of the ICS as components are added or removed from the process and the ICS is adapted accordingly. The industrial control systems described herein store large archives of alarm data in historical databases. Because of the huge amounts of data that must be analyzed and the time and effort required, there is a desire to use data analytics and machine learning techniques in order to support the process of alarm rationalization for industrial control systems.

In one aspect, a method of alarm rationalization for an industrial control system is described. Referring to the flowchart of FIG. 4, the method comprises 402, building a model of the industrial control system. The model is an electronic model of the industrial control system. The model includes components that are monitored or controlled by the industrial control system and alarms associated with the components. At 404, the model is trained by applying one or more machine learning algorithms to a historical database of alarms for the industrial control system. Training the model by applying one or more machine learning algorithms to the historical database of alarms for the industrial control system may comprise using a data mining algorithm to identify frequent patterns in alarm sequences, using a clustering or association rules mining algorithm to correlate alarms and process state, or using a supervised machine learning to model the rationalization process. Training the model by applying one or more machine learning algorithms to the historical database of alarms for the industrial control system may also comprise applying one or more of a MapReduce algorithm, a clustering algorithm, or a correlation detection and co-occurrences algorithm to the historical database of alarms. MapReduce is a programming model and an associated implementation for processing and generating large data sets with a parallel, distributed algorithm on a cluster. The MapReduce algorithm can be used to identify alarm sequences of the longest length in the historical database of alarms, the clustering algorithm can check to determine if clustering technologies helps to identify sequences, and the correlation detection and co-occurrences algorithm can check to see if market basket analysis can be used to identify associations of alarm appearances.

Figure 4:
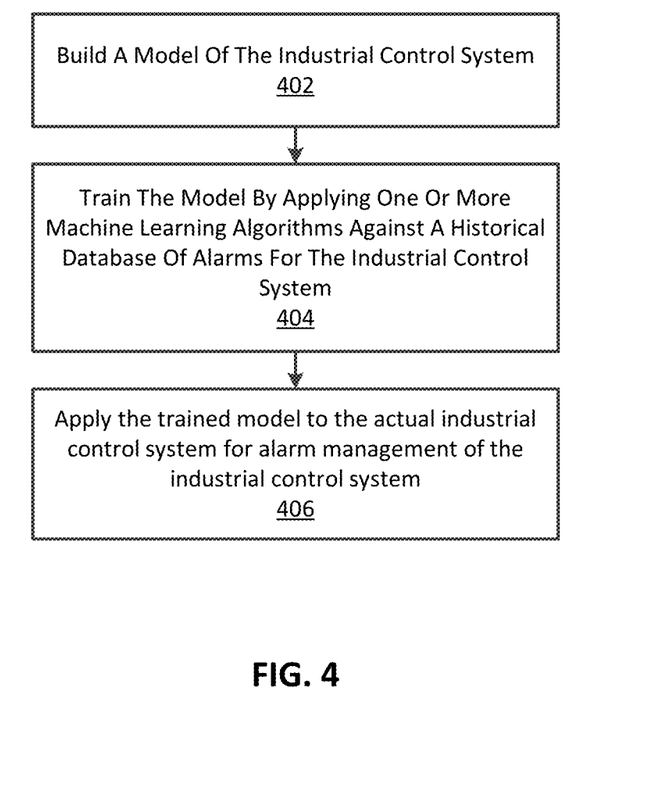
FIG. 4 shows a flow chart of a method of alarm rationalization for an industrial control system.

At 406, the trained model is applied to the actual industrial control system for alarm management of the industrial control system. This may comprise one or more of grouping alarms, decreasing alarm levels, or creating contextual alarms. Such application can be in conformance with alarm management standards such as, for example, EEMUA Publication 191 edition 2 and ISA-18.2-2009, which are fully incorporated by reference and made a part hereof. In one aspect, the model can be further refined by machine learning after the model has been applied to the industrial control system. In this way, the model continues to adapt and learn through use. Alternatively or optionally, for testing purposes the trained model can be applied to a database of alarms before applying the trained model to the actual industrial control system.

Figure 5:
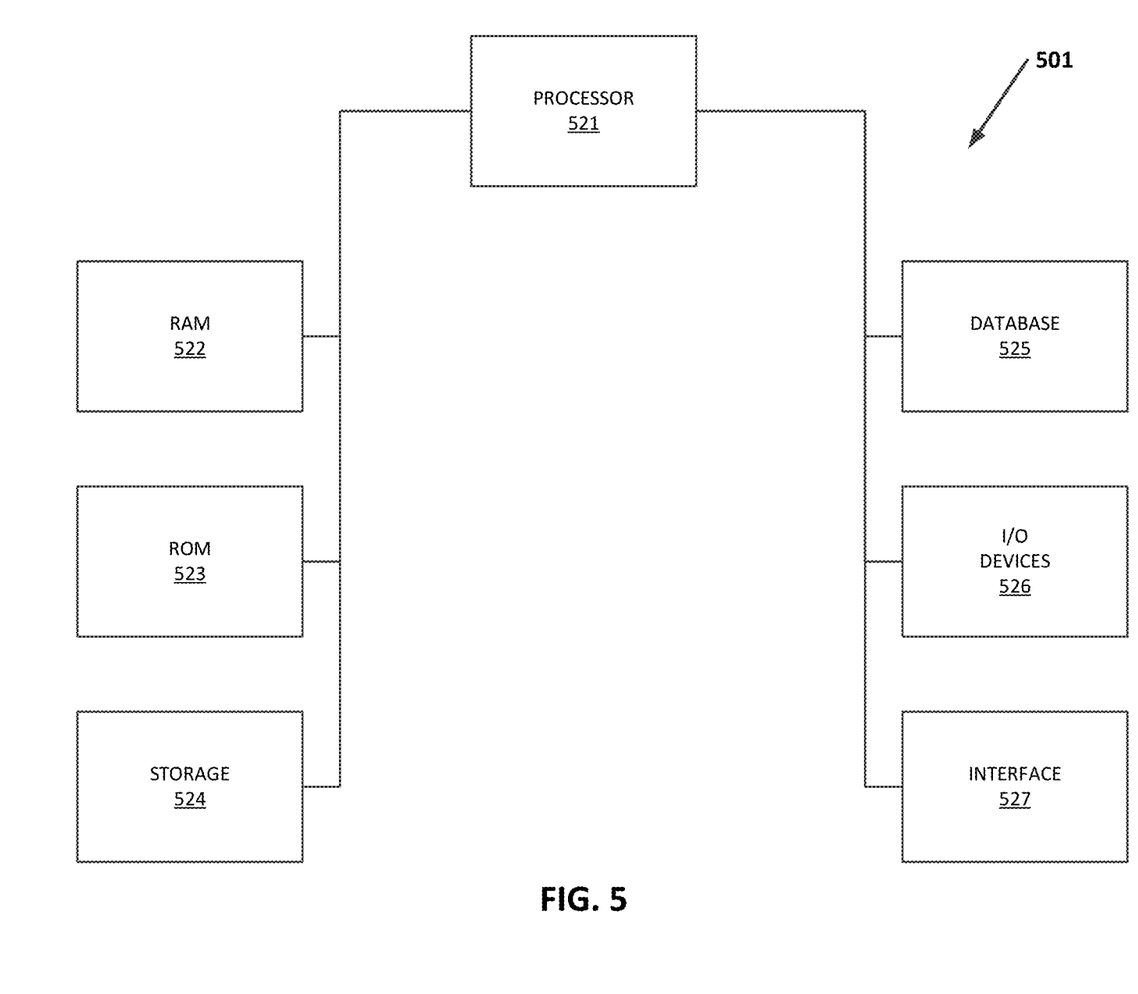
FIG. 5 is a block diagram illustrating an exemplary operating environment for performing the disclosed methods.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software in combination with hardware to perform a method of alarm rationalization for an industrial control system as illustrated in FIG. 5 and described below. In one exemplary aspect, the units can comprise a computer 501 as illustrated in FIG. 5, referenced above and described below.

FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise network PCs, minicomputers, mainframe computers, controllers, smart phones, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

FIG. 5 illustrates an exemplary computer 501 that can be used for alarm rationalization for an industrial control system. In various aspects, the computer 501 of FIG. 5 may comprise all or a portion of the industrial control system 10, as described herein. As used herein, "computer" may include a plurality of computers. The computers may include one or more hardware components such as, for example, a processor 521, a random access memory (RAM) module 522, a read-only memory (ROM) module 523, a storage 524, a database 525, one or more input/output (I/O) devices 526, and an interface 527. Alternatively and/or additionally, computer 501 may include one or more software components such as, for example, a computer-readable medium including computer executable instructions for performing a method associated with the exemplary embodiments. It is contemplated that one or more of the hardware components listed above may be implemented using software. For example, storage 524 may include a software partition associated with one or more other hardware components. It is understood that the components listed above are exemplary only and not intended to be limiting.

Processor 521 may include one or more processors, each configured to execute instructions and process data to perform one or more functions associated with a computer for indexing images. Processor 521 may be communicatively coupled to RAM 522, ROM 523, storage 524, database 525, I/O devices 526, and interface 527. Processor 521 may be configured to execute sequences of computer program instructions to perform various processes. The computer program instructions may be loaded into RAM 522 for execution by processor 521.

RAM 522 and ROM 523 may each include one or more devices for storing information associated with operation of processor 521. For example, ROM 523 may include a memory device configured to access and store information associated with computer 502, including information for identifying, initializing, and monitoring the operation of one or more components and subsystems. RAM 522 may include a memory device for storing data associated with one or more operations of processor 521. For example, ROM 523 may load instructions into RAM 522 for execution by processor 521.

Storage 524 may include any type of mass storage device configured to store information that processor 521 may need to perform processes consistent with the disclosed embodiments. For example, storage 524 may include one or more magnetic and/or optical disk devices, such as hard drives, CD-ROMs, DVD-ROMs, or any other type of mass media device.

Database 525 may include one or more software and/or hardware components that cooperate to store, organize, sort, filter, and/or arrange data used by computer 501 and/or processor 521. For example, database 525 may store historical alarm data. Additionally and/or optionally, database 525 may store instructions and/or information to perform a method of alarm rationalization for an industrial control system by building a model of the industrial control system, wherein the model includes components that are monitored or controlled by the industrial control system and alarms associated with the components; training the model by applying one or more machine learning algorithms against a historical database of alarms for the industrial control system; and applying the trained model against the industrial control system for alarm management of the industrial control system. It is contemplated that database 525 may store additional and/or different information than that listed above.

I/O devices 526 may include one or more components configured to communicate information with a user associated with computer 501. For example, I/O devices may include a console with an integrated keyboard and mouse to allow a user to maintain a database of images, update associations, and access digital content. I/O devices 526 may also include a display including a graphical user interface (GUI) for outputting information on a monitor. I/O devices 526 may also include peripheral devices such as, for example, a printer for printing information associated with controller 520, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 527 may include one or more components configured to transmit and receive data via a communication network, such as the Internet, Ethernet, a local area network, a wide-area network, a workstation peer-to-peer network, a direct link network, a wireless network, or any other suitable communication platform. For example, interface 527 may include one or more modulators, demodulators, multiplexers, demultiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method of alarm rationalization for an industrial control system comprising:
building a model of an alarm rationalization process for the industrial control system, wherein the model includes components that are monitored or controlled by the industrial control system and alarms associated with the components;

training the model by applying one or more machine learning algorithms against a historical database of alarms and corresponding decisions for the industrial control system;

applying the trained model against the industrial control system for alarm rationalization of the industrial control system; and refining the model by machine learning after the model has been applied against the industrial control system.

2. The method of claim 1, further comprising applying the trained model against a database of alarms before applying the trained model against the industrial control system for testing purposes.

3. The method of claim 1, wherein training the model by applying one or more machine learning algorithms against the historical database of alarms for the industrial control system comprises one or more of grouping alarms, decreasing alarm levels, or creating contextual alarms.

4. The method of claim 1, wherein training the model by applying one or more machine learning algorithms against the historical database of alarms for the industrial control system, wherein the one or more machine learning algorithms is at least one of: i) a data mining algorithm to identify frequent patterns in alarm sequences, ii) a clustering algorithm to correlate alarms and process states, and, iii) a supervised machine learning algorithm to model the rationalization process.

5. A system for alarm rationalization for an industrial control system comprising:

a computing device, said computing device having at least a processor and a memory, wherein the processor executes computer-executable instructions stored in the memory, said computer executable instructions cause the processor to:

build a model of an alarm rationalization process for the industrial control system, wherein the model includes components that are monitored or controlled by the industrial control system and alarms associated with the components;

train the model by applying one or more machine learning algorithms against a historical database of alarms and corresponding decisions for the industrial control system;

apply the trained model against the industrial control system for alarm rationalization of the industrial control system; and refine the model by machine learning after the model has been applied against the industrial control system.

6. The system of claim 5, further comprising the processor executing computer-executable instructions stored in the memory that cause the processor to apply the trained model against a database of alarms before applying the trained model against the industrial control system for testing purposes.

7. The system of claim 5, wherein training the model by applying one or more machine learning algorithms against the historical database of alarms for the industrial control system comprises the processor executing computer-executable instructions stored in the memory that cause the processor to one or more of grouping alarms, decreasing alarm levels, or creating contextual alarms.

8. The system of claim 5, wherein training the model by applying one or more machine learning algorithms against the historical database of alarms for the industrial control system comprises the processor executing computer-executable instructions stored in the memory that cause the processor to apply one or more machine learning algorithms, wherein the one or more machine learning algorithms is at least one of: i) a data mining algorithm to identify frequent patterns in alarm sequences, ii) a clustering algorithm to correlate alarms and process states, and, iii) a supervised machine learning algorithm to model the rationalization process.

9. The system of claim 5, wherein the computing device comprises an alarm server.

10. A non-transitory computer-readable medium comprising computer-executable instructions for dynamically displaying a network of alarms, said instructions comprising instruction for:

building a model of an alarm rationalization process for an industrial control system, wherein the model includes components that are monitored or controlled by the industrial control system and alarms associated with the components;

training the model by applying one or more machine learning algorithms against a historical database of alarms and corresponding decisions for the industrial control system;

applying the trained model against the industrial control system for alarm rationalization of the industrial control system; and refining the model by machine learning after the model has been applied against the industrial control system.

11. The computer-readable medium of claim 10, further comprising applying the trained model against a database of alarms before applying the trained model against the industrial control system for testing purposes.

12. The computer-readable medium of claim 10, wherein training the model by applying one or more machine learning algorithms against the historical database of alarms for the industrial control system comprises one or more of grouping alarms, decreasing alarm levels, or creating contextual alarms.

13. The computer-readable medium of claim 10, wherein training the model by applying one or more machine learning algorithms against the historical database of alarms for the industrial control system, wherein the one or more machine learning algorithms is at least one of: i) a data mining algorithm to identify frequent patterns in alarm sequences, ii) a clustering algorithm to correlate alarms and process states, and, iii) a supervised machine learning algorithm to model the rationalization process.

14. The computer-readable medium of claim 10, wherein the computer-executable instructions are executed by an alarm server.

* * * * *